(12) United States Patent
Kim et al.

(10) Patent No.: US 10,061,982 B2
(45) Date of Patent: Aug. 28, 2018

(54) HAND-ATTACHABLE WEARABLE DEVICE CAPABLE OF IRIS RECOGNITION INDOORS AND/OR OUTDOORS

(71) Applicants: IRITECH, INC., Fairfax, VA (US); Dae Hoon Kim, Seoul (KR)

(72) Inventors: Dae Hoon Kim, Seoul (KR); Hyeong In Choi, Seoul (KR); Byoung Jin Jun, Seoul (KR); Seung Min Paik, Seoul (KR); Haeng Moon Kim, Gwacheon-si (KR); Jung Woon Ryu, Seoul (KR); Seung Woon Ryu, Seoul (KR)

(73) Assignees: Iritech, Inc., Fairfax, VA (US); Dae Hoon Kim, Seoul (KR)

( * ) Notice: Subject to any disclaimer, the term of this patent is extended or adjusted under 35 U.S.C. 154(b) by 0 days.

(21) Appl. No.: 15/317,936

(22) PCT Filed: Jun. 9, 2015

(86) PCT No.: PCT/KR2015/005763
§ 371 (c)(1),
(2) Date: Dec. 9, 2016

(87) PCT Pub. No.: WO2015/190796
PCT Pub. Date: Dec. 17, 2015

(65) Prior Publication Data
US 2017/0124393 A1    May 4, 2017

(30) Foreign Application Priority Data
Jun. 10, 2014    (KR) ........................ 10-2014-0069872

(51) Int. Cl.
*G06K 9/00* (2006.01)
*G04G 21/00* (2010.01)
*G06F 1/16* (2006.01)

(52) U.S. Cl.
CPC ......... *G06K 9/00617* (2013.01); *G04G 21/00* (2013.01); *G06F 1/163* (2013.01); *G06K 9/0061* (2013.01); *G06K 9/00604* (2013.01)

(58) Field of Classification Search
CPC .......... G06K 9/00617; G06K 9/00604; G06K 9/0061; G06F 1/163; G04G 21/00
See application file for complete search history.

(56) References Cited

U.S. PATENT DOCUMENTS

| 8,947,382 B2 | 2/2015 | Winkler et al. |
| 2014/0159862 A1* | 6/2014 | Yang .................... A61B 5/1171 340/5.52 |

(Continued)

FOREIGN PATENT DOCUMENTS

| KR | 10-1999-0046393 A | 7/1999 |
| KR | 10-2006-0119077 A | 11/2006 |

(Continued)

OTHER PUBLICATIONS

PCT International Search Report for PCT Counterpart Application No. PCT/KR2015/005763, 5 pp. (including English translation), (dated Sep. 16, 2015).

(Continued)

*Primary Examiner* — Ruiping Li
(74) *Attorney, Agent, or Firm* — Womble Bond Dickinson (US) LLP

(57) ABSTRACT

The present invention relates to a hand-attachable wearable device capable of iris identification outdoors and/or indoors, which includes an electronic component case and a band covering a wrist or a finger, and particularly, to a hand-attachable wearable device capable of iris identification outdoors and/or indoors, which includes an indoor and outdoor-combined photographing unit or an indoor and outdoor-separated photographing unit installed at one side of the case, which is used for photographing an iris image in (Continued)

which reflection noise is reduced indoors and outdoors, an infrared lighting installed at one side of the case and required for photographing the iris image clearly, and an iris recognition unit performing the iris recognition by comparing registered and stored iris image information and photographed iris image information.

37 Claims, 7 Drawing Sheets

(56) References Cited

U.S. PATENT DOCUMENTS

2015/0331241 A1* 11/2015 Haddick .................. G06T 7/80
                                                            345/629
2016/0349790 A1* 12/2016 Connor ................. G06F 1/1694

FOREIGN PATENT DOCUMENTS

| KR | 10-0729813 B1 | 6/2007 |
| KR | 10-1030652 B1 | 4/2011 |

OTHER PUBLICATIONS

PCT Written Opinion of the International Searching Authority for PCT Counterpart Application No. PCT/KR2015/005763, 11 pp., (dated Sep. 16, 2015).

* cited by examiner

[FIG. 1]
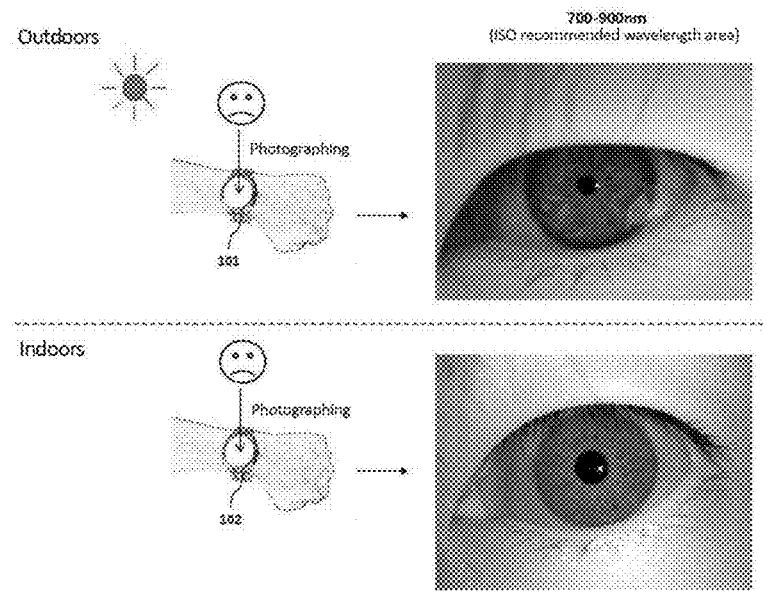
[FIG. 2]
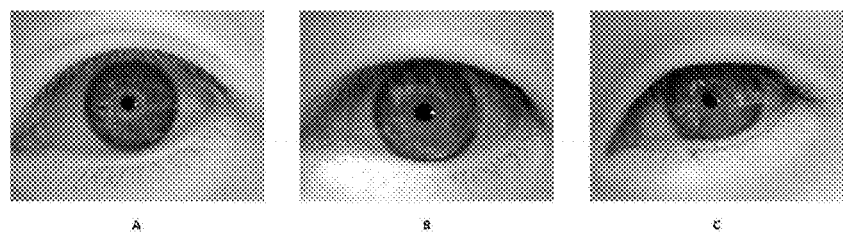
[FIG. 3]
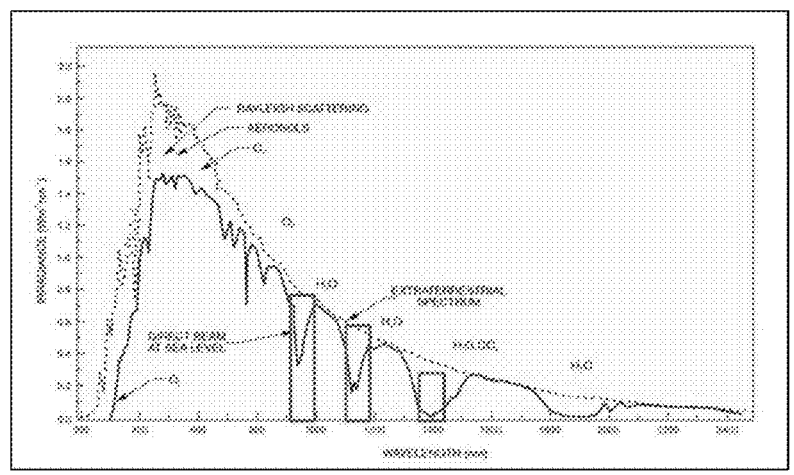

[FIG. 4]
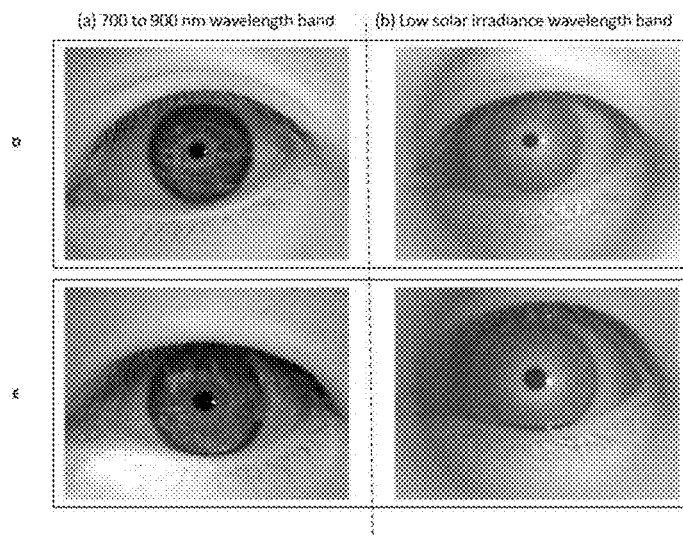
[FIG. 5]
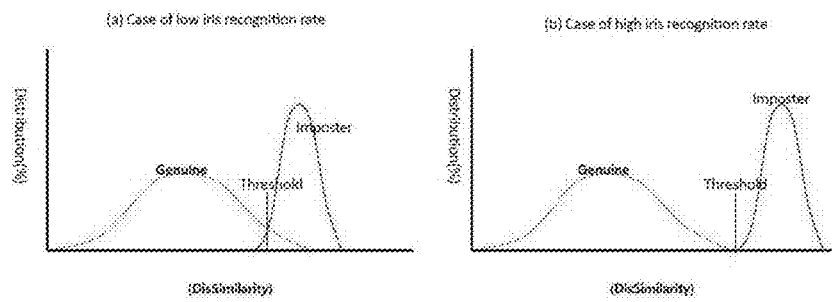
[FIG. 6]
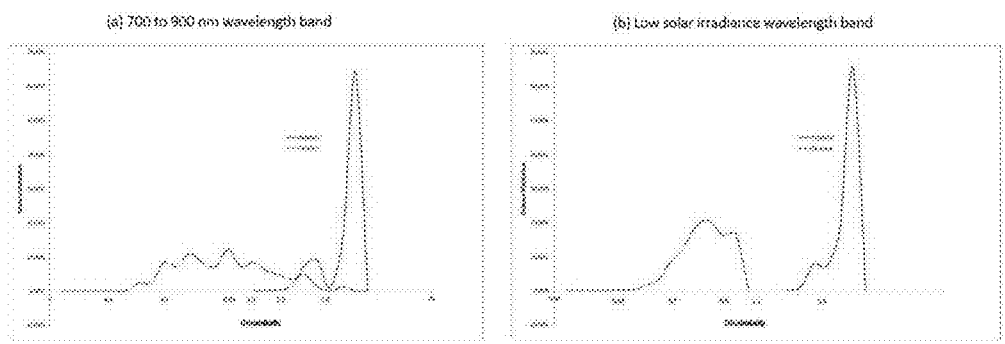

[FIG. 7]
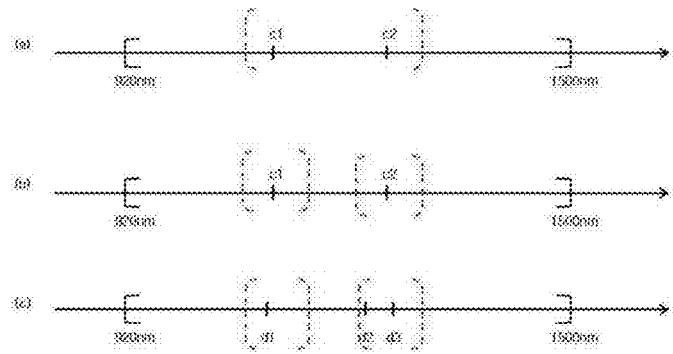
[FIG.8]
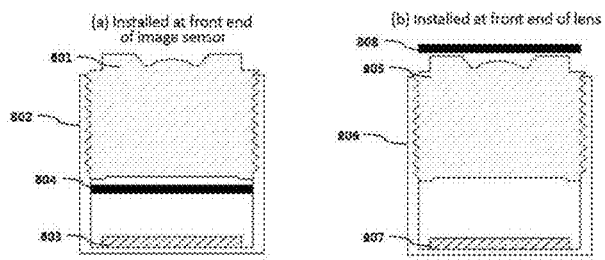
[FIG.9]
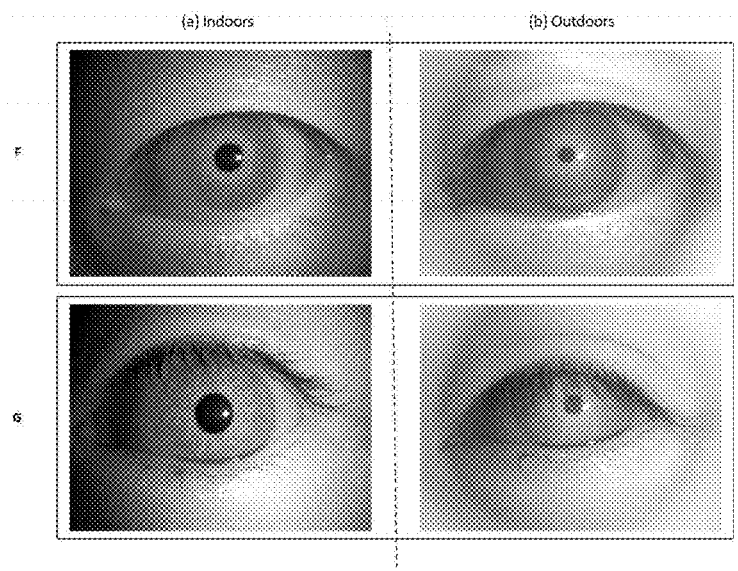

[FIG. 10]
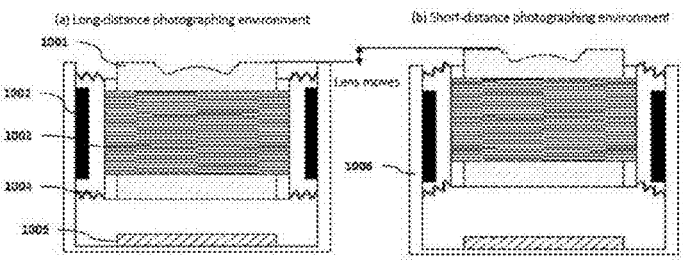
[FIG. 11]
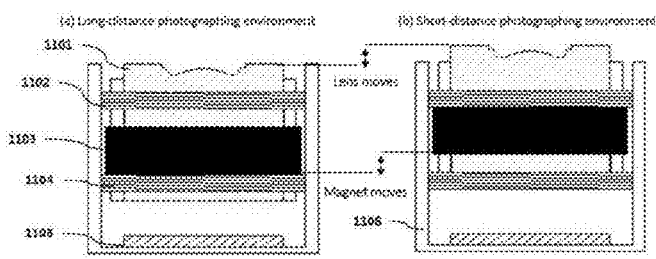
[FIG. 12]
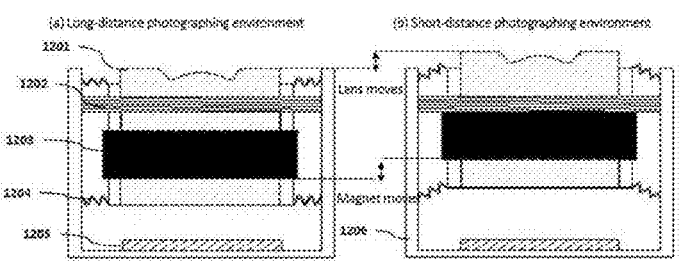
[FIG. 13]
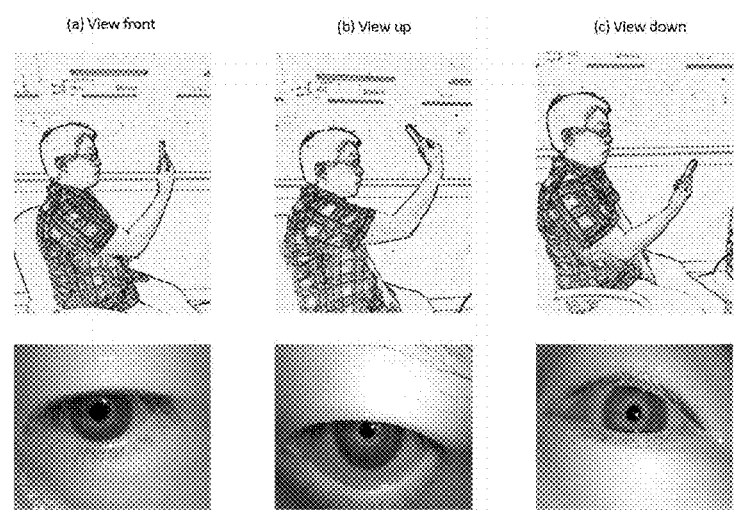

[FIG. 14]
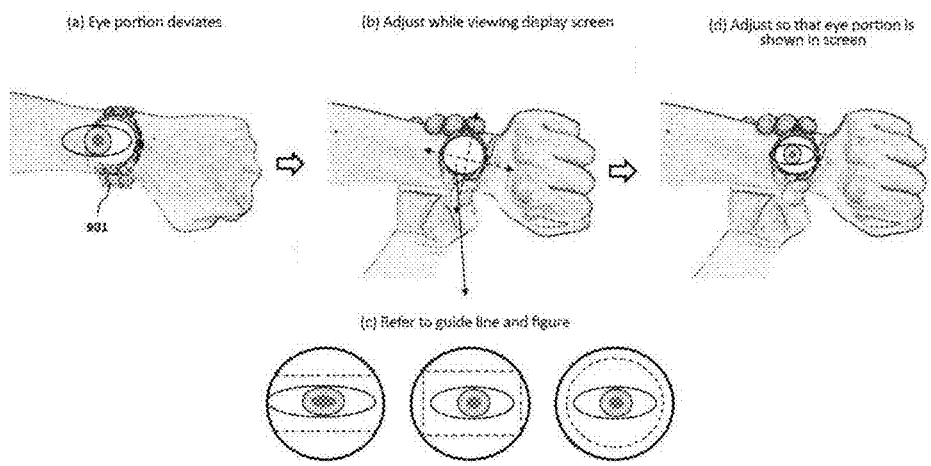
[FIG. 15]
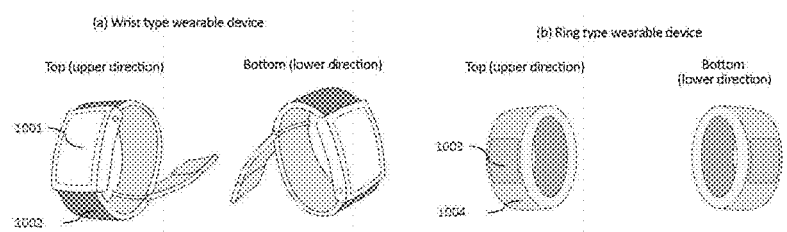
[FIG. 16]
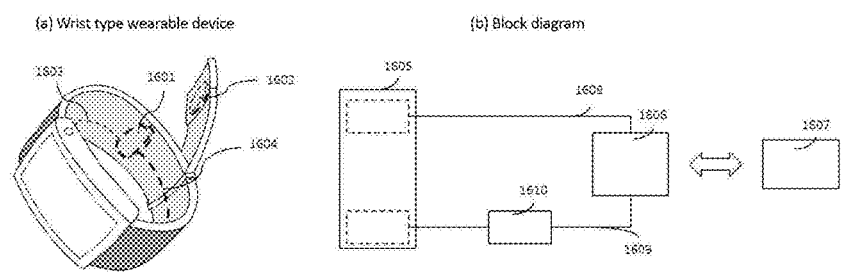

[FIG. 17]
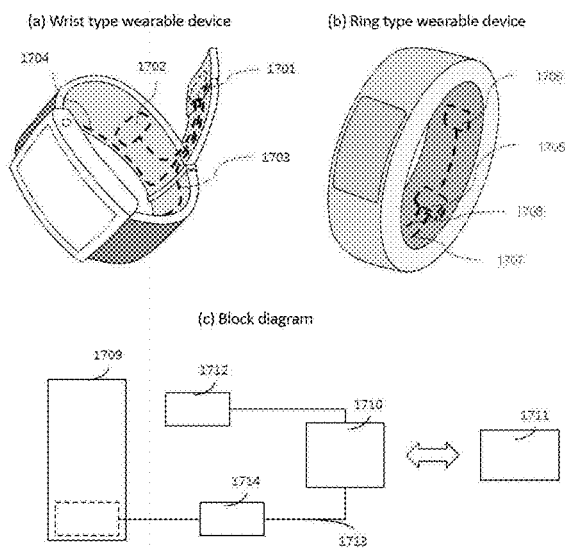
[FIG. 18]
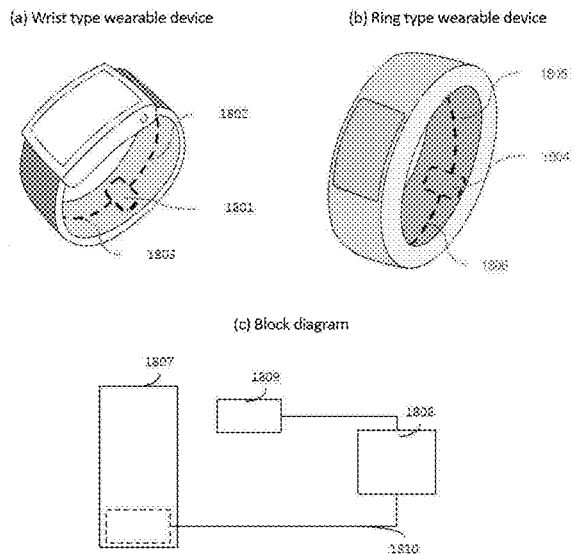

[FIG. 19]
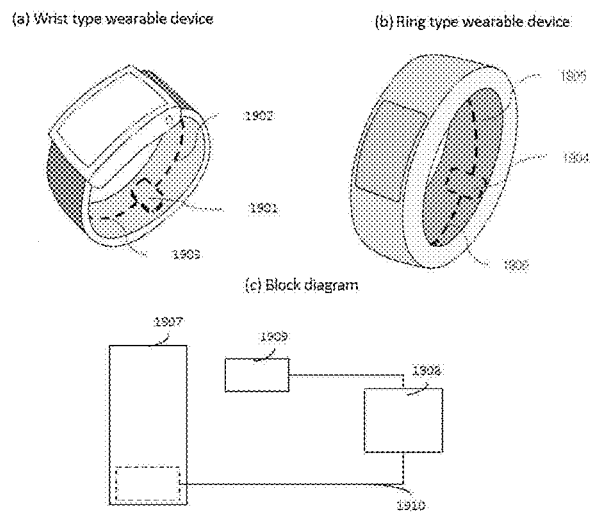
[FIG. 20]
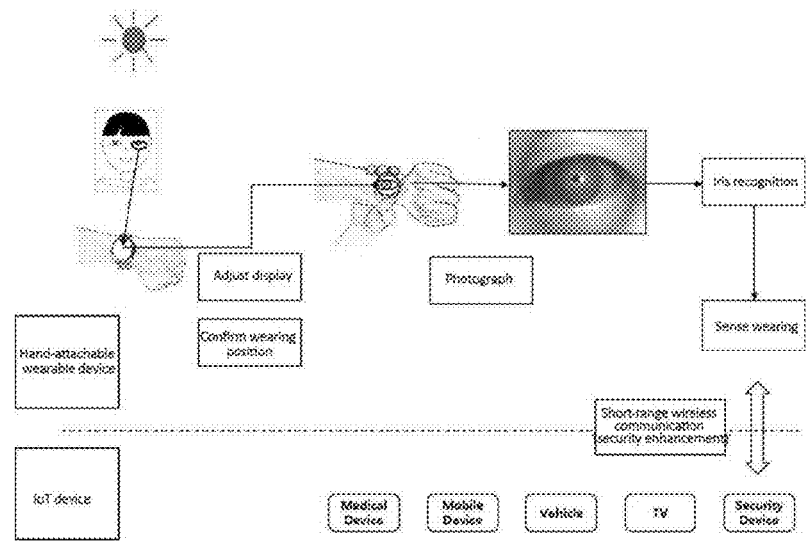
[FIG. 21]
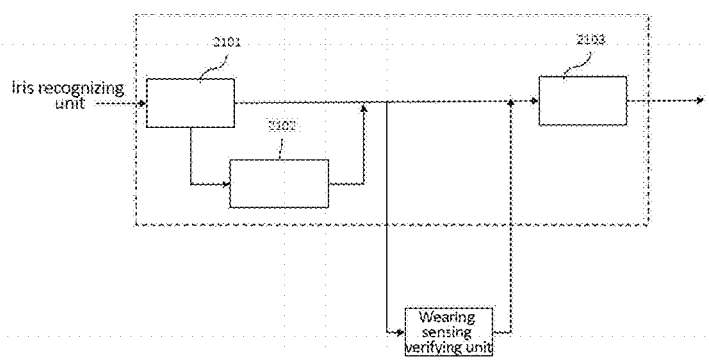

HAND-ATTACHABLE WEARABLE DEVICE CAPABLE OF IRIS RECOGNITION INDOORS AND/OR OUTDOORS

CROSS-REFERENCE TO RELATED APPLICATIONS

This patent application is a U.S. National Phase Application under 35 U.S.C. § 371 of International Application No. PCT/KR2015/005763, filed Jun. 9, 2015, entitled HAND-ATTACHABLE WEARABLE DEVICE CAPABLE OF IRIS IDENTIFICATION INDOORS AND OUTDOORS, which claims priority to Korean Patent Application No. 10-2014-0069872, filed Jun. 10, 2014.

TECHNICAL FIELD

The present invention relates to a hand-attachable wearable device capable of iris identification outdoors and/or indoors, and particularly, to a hand-attachable wearable device capable of iris identification outdoors and/or indoors, which includes a case protecting an electronic component and a band covering a wrinkle or a finger and includes an indoor and outdoor combined photographing unit or an indoor and outdoor separation photographing unit for photographing an iris image in which reflection noise is reduced even indoors and outdoors, an infrared lighting required for photographing the iris image, and an iris recognition unit performing iris recognition as the photographed iris image.

BACKGROUND ART

In recent years, as a next-generation technology which substitutes for a smart phone, a wearable device has rapidly appeared and in particular, innovative products have been released or are schedule to be released in the near future in various areas including sports equipment companies including Nike, Adidas, etc., as well as technological leading companies including Samsung Electronics, Apple, Google, etc. Actually, Google Glass 2.0 and Smart Watch are scheduled to been announced and Apple i-Watch is schedule to be released. As another example, models including Galaxy Gear of Samsung Electronics, Fuel Band of Nike, etc., have been released.

A research into the wearable device first started in MIT, Carnegie Mellon University, etc., but since 2010, technological innovation has started to rapidly become a reality after activation of the smart phone. In particular, since 2010, independently using the wearable device which have been propelled in the existing research and development has been changed to a connected device type in which information collected by the wearable device is mutually transmitted to and exchanged with an electronic device such as the smart phone, and as a result, the wearable device interlocks with the electronic device such as the smart phone.

Further, the wearable device is primarily released and used for four purposes (a fitness function, a health care function, an infotainment function, and a military/industrial function) at present. In detail, even except for the purpose of the special military/industrial function, unlike the existing other devices, the wearable device is attached to a body as types of accessory shapes (a spectacle attachment type, a bracelet type, an arm band type, a pendant type, a wrist wearable type, etc.,) to store all ordinary life patterns of a user, which include personal exercise information (a distance, a speed, consumed calorie, heart rate, etc.,) or personal health related information (disease information including blood sugar, etc., bio signal sensing, etc.,), personal privacy data, etc., like a mobile device and performs network connection with the smart phone or various devices, and as a result, a security issue is actually very important.

Accordingly, a device of which security is more strengthened than a method which has been applied to other devices up to now is required for use and robbery protection of the wearable device and protecting personal information of the user, which exists in the wearable device.

However, as compared with the existing mobile related device which has made various attempts to use biometric information which is unique physical information of a person for security strengthening, a research related therewith has not yet been actually progressed in the wearable device up to now. In particular, there are not actually very many researches for strengthening the security of the wearable device using the iris, which has been announced to have much higher recognition rate than other biometric recognition methods including a fingerprint, a vein, etc.

It is actually very difficult to apply technologies and methods associated with the iris recognition, which are applied in various devices in the related art as they are in order to solve the aforementioned problem because there are several primary differences due to unique characteristics of only wearable device itself.

First, since the wearable device used while being attached to a hand is continuously attached to the body, the wearable device needs to be able to perform the iris recognition outdoors as well as indoors. Second, a display screen which a user can look closely at with his/her eye for the iris recognition is relatively smaller than that of the device in the related art. Third, there is a high possibility that the user will alternately use both hands without fixing a position to be worn to any one hand unlike different devices and in addition, there is a very high possibility that the user will wear the wearable device without distinguishing upper and lower positions. Fourth, since the user does not generally take off the wearable device once the user wears the wearable device, it is very inconvenient to continuously take an authentication like a cellular phone whenever using the wearable device and last, since there is a very high possibility that the wearable device will be operated as a connected device in which the wearable device interlocks with various devices including the smart phone through mutual transmission and exchange by using an Internet of things (IoT) method, the wearable device is sensitive to a security issue.

As related prior art, disclosed is a technology associated with a wrist type wearable device of U.S. Pat. No. 8,947,382 B2 disclosed, but this technology is also irrespective of a technical configuration of the present invention associated with the hand-attachable wearable device using the iris recognition.

Accordingly, a demand for the hand-attachable wearable device capable of iris recognition outdoors and/or indoors has been actually increased, which has increased user convenience while considering the unique characteristics of the wearable device itself different from the device in the related art, which are described above and sufficiently considering physical space and economic cost issues.

SUMMARY

In order to solve the problem, an object of the present invention is to provide a hand-attachable wearable device capable of iris recognition outdoors and/or indoors, which photographs and acquires an iris image of which reflection noise is reduced indoors and outdoors by means of the hand-attachable wearable device and performs the iris recognition by using the acquired iris image.

In order to solve the problem, another object of the present invention is to provide a hand-attachable wearable device capable of iris recognition outdoors and/or indoors, which allows a user to intuitively photograph and acquire an iris image by means of the hand-attachable wearable device to increase convenience of the user.

In order to solve the problem, yet another object of the present invention is to prevent upper and lower sides of an iris image from being changed because a wearing position of a wrist type wearable device capable of iris recognition outdoors and/or indoors is changed.

In order to solve the problem, still yet another object of the present invention is to provide a hand-attachable wearable device capable of iris recognition outdoors and/or indoors, senses wearing of the hand-attachable wearable device.

In order to solve the problem, still yet another object of the present invention is to provide a hand-attachable wearable device capable of iris recognition outdoors and/or indoors, which is configured to perform a user authentication again when a user cancels wearing the hand-attachable wearable device without requiring an additional user authentication while maintaining a current user authentication state while the user wears the hand-attachable wearable device after the user authentication (iris recognition) by sensing wearing of the hand-attachable wearable device.

In order to solve the problem, still yet another object of the present invention is to perform the iris recognition by using an iris image in a hand-attachable wearable device capable of iris recognition outdoors and/or indoors.

In order to solve the problem, still yet another object of the present invention is to strengthen a security when performing communication with another device (primarily, an IoT device) in a hand-attachable wearable device capable of iris recognition outdoors and/or indoors.

A solving means of the present invention provides a hand-attachable wearable device capable of iris identification outdoors and/or indoors, which includes an electronic component case and a band covering a wrist or a finger, and particularly, to a hand-attachable wearable device capable of iris identification outdoors and/or indoors, which includes an indoor and outdoor combined photographing unit installed at one side of the case, which is used for photographing an iris image in which reflection noise is reduced indoors and outdoors, an infrared lighting installed at one side of the case and required for definitely photographing the iris image, and an iris recognition unit performing the iris recognition by comparing registered and registered iris image information and photographed iris image information.

Further, another solving means of the present invention provides a hand-attachable wearable device capable of iris identification outdoors and/or indoors, which includes an electronic component case and a band covering a wrist or a finger, and particularly, to a hand-attachable wearable device capable of iris identification outdoors and/or indoors, which includes an indoor and outdoor combined photographing unit or an indoor and outdoor separation photographing unit installed at one side of the case, which is used for photographing an iris image in which reflection noise is reduced indoors and outdoors, an infrared lighting installed at one side of the case and required for definitely photographing the iris image, and an iris recognition unit performing the iris recognition by comparing registered and registered iris image information and photographed iris image information.

Yet another solving means of the present invention provides a hand-attachable wearable device capable of iris recognition outdoors and/or indoors, in which displays including a cold mirror (a visible light reflection filter) or an LCD, an LED, an OLED, etc., are installed a photographing unit is configured on the bottom or at a left or right position of a display screen which is a best angle to easily photograph an entire eye portion required for iris recognition.

Still yet another solving means of the present invention provides a wearing position verifying unit which prevents upper and lower sides of an iris image from being changed by sensing a wearing position of a hand-attachable wearable device capable of iris recognition outdoors and/or indoors.

Still yet another solving means of the present invention provides a wearing sensing verifying unit which senses whether a user wears a hand-attachable wearable device capable of iris recognition outdoors and/or indoors.

Still yet another solving means of the present invention provides a wearing sensing verifying unit which is configured to perform a user authentication again when a user cancels wearing without requiring an additional user authentication while maintaining a current user authentication state while the user wears a hand-attachable wearable device after the user authentication (iris recognition) by sensing wearing of a hand-attachable wearable device capable of iris recognition outdoors and/or indoors.

Still yet another solving means of the present invention provides an iris recognition unit which performs iris recognition by using an iris image which is photographed and acquired in a hand-attachable wearable device capable of iris recognition outdoors and/or indoors.

Still yet another solving means of the present invention provides a security strengthening unit which strengthens a security when performing communication with another device (primarily, an IoT device) in a hand-attachable wearable device capable of iris recognition outdoors and/or indoors.

According to the present invention, there is an advantageous effect to photograph and acquire an iris image of which reflection noise is reduced indoors and outdoors by using an indoor and outdoor combined photographing unit or an indoor and outdoor separation photographing unit for picking the iris image.

Another effect of the present invention is to increase convenience of a user by installing displays including a cold mirror (a visible light reflection filter) or an LCD, an LED, an OLED, etc., in a hand-attachable wearable device capable of iris recognition outdoors and/or indoors and configuring a photographing unit on the bottom or at a left or right position of a display screen which is a best angle to easily photograph an entire eye portion required for iris recognition.

Yet another effect of the present invention is to prevent upper and lower sides of an iris image from being changed by sensing a wearing position of hand-attachable wearable device capable of iris recognition outdoors and/or indoors by providing a wearing position verifying unit.

Still yet another effect of the present invention is to sense whether a user wears a hand-attachable wearable device capable of iris recognition outdoors and/or indoors by providing a wearing sensing verifying unit.

Still yet another object of the present invention is to configure a user authentication again when a user cancels wearing without requiring an additional user authentication while maintaining a current user authentication state while the user wears a hand-attachable wearable device after the user authentication (iris recognition) by sensing wearing of a hand-attachable wearable device capable of iris recognition outdoors and/or indoors by providing a wearing sensing verifying unit.

Still yet another object of the present invention is to perform iris recognition by using an iris image which is photographed and acquired in a hand-attachable wearable device capable of iris recognition outdoors and/or indoors by providing an iris recognition unit.

Still yet another object of the present invention is to strengthen a security when performing communication with another device (primarily, an IoT device) in a hand-attachable wearable device capable of iris recognition outdoors and/or indoors by providing a security strengthening unit.

BRIEF DESCRIPTION OF THE DRAWINGS

FIG. 1 illustrates an iris image acquired by the same hand-attachable wearable device by distinguishing an indoor environment and an outdoor environment by means of a lighting in a near infrared area of 800 to 900 nm which is the existing ISO recommended area with respect to an iris of the same person according to an embodiment of the present invention.

FIG. 2 illustrates iris images of respective different three persons (A, B, and C) acquired by a hand-attachable wearable device in an outdoor environment by the existing lighting in a near infrared area according to an embodiment of the present invention.

FIG. 3 illustrates a solar radiation spectrum according to an embodiment of the present invention.

FIG. 4 illustrates an iris image acquired by photographing the same iris at a left side of respective different persons in the existing photographing wavelength band (700 to 900 nm) and low solar irradiance wavelength band (920 nm to 1500 nm) according to an embodiment of the present invention.

FIG. 5 illustrates a graph for describing dissimilarity according to an embodiment of the present invention.

FIG. 6 illustrates a distribution acquired by photographing the iris image in the existing photographing wavelength band (700 to 900 nm) and low solar irradiance wavelength band (920 nm to 1500 nm) outdoors according to an embodiment of the present invention.

FIG. 7 illustrates a principle of variously selecting the low solar irradiance wavelength band using a band-pass filter according to an embodiment of the present invention.

FIG. 8 illustrates an example for describing a configuration of an indoor and outdoor combined filter photographing unit and a position of the band-pass filter according to an embodiment of the present invention.

FIG. 9 illustrates that iris images of respective different persons F and G are photographed and acquired by using the indoor and outdoor combined filter photographing unit indoors and outdoors in the low solar irradiance wavelength band (920 nm to 1500 nm) according to an embodiment of the present invention.

FIG. 10 illustrates an example for describing a configuration and an operation principle of a control coil operation unit which is one of a photographing operation unit according to an embodiment of the present invention.

FIG. 11 illustrates an example for describing configurations and operation principles of multi coil operation units which is one of the photographing operation unit according to an embodiment of the present invention.

FIG. 12 illustrates an example for describing a configuration and an operation principle of a lens magnet operation unit which is one of the photographing operation unit according to an embodiment of the present invention.

FIG. 13 illustrates an example for describing a disadvantage which occurs when photographing an iris image while viewing a display screen of a smart phone according to an embodiment of the present invention.

FIG. 14 illustrates an example for assisting appreciation of a process of picking the iris image while a user views the display screen in a hand-attachable wearable device according to an embodiment of the present invention.

FIG. 15 illustrates an example for appreciating that a position is not easily distinguished when upper and lower directions of a wrist type wearable device and a ring type wearable device are changed according to an embodiment of the present invention.

FIG. 16 illustrates an example of a wearing sensing verifying unit configured by a magnetic sensor of the hand-attachable wearable device through a picture according to an embodiment of the present invention.

FIG. 17 illustrates an example of a wearing sensing verifying unit configured by a static electricity sensor of the hand-attachable wearable device through the picture according to an embodiment of the present invention.

FIG. 18 illustrates an example of a wearing sensing verifying unit configured by a temperature sensor of the hand-attachable wearable device through the picture according to an embodiment of the present invention.

FIG. 19 illustrates an example of a wearing sensing verifying unit configured by a proximity sensor of the hand-attachable wearable device through the picture according to an embodiment of the present invention.

FIG. 20 illustrates an example for assisting appreciation of a process of communication between the hand-attachable wearable device and an IoT device according to an embodiment of the present invention.

FIG. 21 illustrates an example for describing a configuration of a security strengthening unit of the hand-attachable wearable device according to an embodiment of the present invention.

DETAILED DESCRIPTION

The present invention relates to a hand-attachable wearable device capable of iris identification outdoors and/or indoors, which includes an electronic component case and a band covering a wrist or a finger, and particularly, to a hand-attachable wearable device capable of iris identification outdoors and/or indoors, which includes an indoor and outdoor combined photographing unit installed at one side of the case, which is used for photographing an iris image in which reflection noise is reduced indoors and outdoors, an infrared lighting installed at one side of the case and required for definitely photographing the iris image, and an iris recognition unit performing the iris recognition by comparing registered and registered iris image information and photographed iris image information.

Detailed contents for carrying out the present invention will be described.

Hereinafter, a configuration and an operation of an embodiment of the present invention will be described with reference to the accompanying drawings and the configuration and the operation of the present invention illustrated and described in the drawings are described as at least one embodiment and the technical spirit of the present invention and a core configuration and an operation thereof are not limited thereto.

Accordingly, various modifications and transformations of core components of a hand attachable wearable device capable of iris recognition outdoors and/or indoors can be made by those skilled in the art to which an embodiment of the present invention belongs within the scope without departing from essential characteristics of an embodiment of the present invention.

Further, terms such as A, B, (a), (b), etc., may be used in describing the components of the embodiments according to the present invention. The terms are only used to distinguish a component from another component, but nature or an order of the component is not limited by the terms. When it is disclosed that any component is "connected", "included", or "configured" to other components, it should be understood that the component may be directly connected or linked to other components, but another component may be "connected", "included", or "configured" between the respective components.

Further, in the present invention, in different drawings, different reference numerals denote the same components for easy appreciation.

Embodiments

Detailed contents for carrying out the present invention will be described.

First, in the present invention, for easy description, a hand attached type wearable device is defined to include a wearable device (hereinafter, referred to as a 'wrist-type wearable device') worn on a wrist and a wearable device (hereinafter, referred to as a 'ring-type wearable device') worn on a finger.

Further, a clock or ring shape will be primarily described, which is a representative type of the wrist-type wearable device and the ring-type wearable determined to best appreciate the gist of the present invention among various hand attached type wearable devices including clock, bracelet, band, smart ring, arm band sport type measurement devices, etc.

Accordingly, even though the hand attached-type wearable device having the clock or ring shape is given as an example, hand attached-type wearable devices having various different shapes can also be sufficiently described by the same method, and as a result, it should be appreciated that the same application is available.

Further, various hand attached-type wearable devices fundamentally include a case (hereinafter, referred to as an 'electronic component case') housing or protecting electronic components and a band covering the wrist or finger.

As primary unique characteristics which need to be considered in order to apply iris recognition to the hand attached-type wearable device, first, the hand attached-type wearable device is continuously attached to a hand of a user.

Second, a display screen which the user can look closely at with his/her eye for the iris recognition is relatively smaller than that of the device in the related art.

Third, there is a high possibility that the user will not use the wearable device without distinguishing a position to be worn, but will alternately use both hands and in addition, there is a very high possibility that the user will wear the wearable device without distinguishing upper and lower positions.

Fourth, since the user does not generally take off the wearable device once the user wears the wearable device, it is very inconvenient to continuously take an authentication like a cellular phone whenever using the wearable device and last, since there is a very high possibility that the wearable device will be operated as a connected device in which the wearable device interlocks with various IoT devices including the smart phone through mutual transmission and exchange by using an Internet of things (IoT) method, the wearable device is sensitive to a security issue.

Next, a configuration of the present invention considering that the user uses the hand attached-type device indoors and outdoors among the unique characteristics of only the hand attached-type wearable device itself will be described in detail.

The exiting iris recognition method includes the steps of acquiring an image (hereinafter, referred to as an 'iris image') of an eye including an iris from a camera, extracting an iris area in the iris image, finding a personal unique feature in the extracted iris area, and thereafter, determining a similarity between two iris features as a last step and the iris is picked by using an infrared lighting without using a visible-ray lighting in order to prevent recognition rate of the iris image from being deteriorated due to a reflection image caused due to light reflection of a visible-ray area and noise (hereinafter, referred to as 'reflection noise') by reflection. Actually, almost all iris recognition related enterprise and institutions use a lighting in a near infrared area of 700 to 900 nm recommended in ISO/IEC 19794-6 (2011).

However, unlike the inside having the intensity of light of a maximum of thousands of lux, in the outside where the intensity of light such as direct rays corresponding to tens of thousands of lux to 130 thousands of lux exist, the noise by the reflection cannot be reduced even by the lighting in the near infrared area of 700 to 900 nm, and as a result, it has been known that the iris recognition is unavailable outdoors.

FIG. 1 illustrates an iris image acquired by the same hand-attachable wearable device by distinguishing an indoor environment and an outdoor environment by means of a lighting in a near infrared area of 800 to 900 nm which is the existing ISO recommended area with respect to an iris of the same person according to an embodiment of the present invention.

FIG. 1 illustrates an iris image of a left eye the same person acquired by the same hand-attachable wearable device and it can be seen that a surrounding environment is reflected and seen in the eye due to sunlight having the existing strength of light even by lighting in the existing lighting in the near infrared area of 800 to 900 nm unlike the indoor environment in the outdoor environment. Actually, as illustrated in FIG. 1, when the iris image reflected in the outdoor environment is photographed unlike the iris image photographed in the outdoor environment, the iris recognition rate significantly deteriorates, and as a result, the iris recognition is almost impossible.

FIG. 2 illustrates iris images of respective different three persons (A, B, and C) acquired by a hand-attachable wearable device in an outdoor environment by the existing lighting in a near infrared area according to an embodiment of the present invention.

In FIG. 2, the iris images of respective other three persons (A, B, and C) are selected and illustrated in data acquired by photographing the left eyes of various persons in the same outdoor environment by means of the same hand-attachable wearable device and it can be seen that the surrounding environment is reflected and seen in the eye.

Accordingly, as illustrated in FIGS. 1 and 2, it can be seen that it is almost impossible to acquire a clear iris image in which the iris recognition is possible by means of the lighting in the near infrared area of 800 to 900 nm which the existing iris recognition related enterprise and institutions observe (recommended in a version of 2011 of ISO/IEC 19794-6).

However, since the had-attachable wearable device is continuously attached to a hand of a user, the had-attachable wearable device needs to be able to perform the iris recognition outdoors as well as indoors. The reason is that it is very inconvenient in terms of convenience of the user that the user performs the iris recognition by going indoors whenever performing a security related authentication while using the hand-attachable wearable device, and as a result, a possibility that the user will use the hand-attachable wearable device significantly decreases.

Next, the configuration for the iris recognition indoors in order to solve the problems will be described in detail.

First, in order to find a section in which the iris image may be photographed even outdoors as the strengths of infrared rays and visible rays which are primary causes which bring about the reflection noise at the time of photographing the iris image indoors is equal to or lower than a specific value, a distribution for each wavelength (see World Weather Organization (WMO)) of solar irradiance in an earth atmospheric environment is used.

FIG. 3 illustrates a solar radiation spectrum according to an embodiment of the present invention.

FIG. 3 is a diagram illustrating the distribution for each wavelength of the solar irradiance in the earth atmospheric environment, which has already been globally known and the diagram is illustrated slightly differently for each institution which measures the distribution for each wavelength of the solar irradiance globally, but if the diagram meets the purpose and the gist of the present invention, any diagram may be referred and used.

As illustrated in FIG. 3, referring to the distribution for each wavelength of the solar irradiance, it can be seen that a wavelength band (an area expressed by a red square) in which an irradiance value rapidly decreases in a specific infrared wavelength band area exists. Since the strength of the sunlight indoors is reduced in this wavelength band, an environment to reduce the reflection noise of the iris image may be provided.

Based on such a fact, a wavelength band in which the environment to reduce the reflection noise is provided when the strength of the irradiance is equal to or lower than a specific value even outdoors exists and it can be discovered that the iris image in which the reflection noise is reduced so as to recognize the iris even outdoors may be acquired in the wavelength band through repeated inspection of various experiments. In detail, the wavelength band in which the iris image in which the reflection noise is reduced so as to recognize the iris even outdoors may be acquired is 920 to 1500 nm and in particular, it can be seen that it is very effective in the wavelength band of 920 to 960 nm, the wavelength band of 1110 to 1160 nm, and the wavelength band of 1300 to 1500.

However, the illuminance indicating the brightness of the infrared lighting and the irradiance are not just proportional to each other and an error for the aforementioned wavelengths and a boundary value of the wavelength occurs due to an acceptable wavelength band area range (for example, 10 nm, 25 nm, 50 nm, and the like) of an IR band-pass filter and IR LED power, and as a result, an accurate wavelength band range to reduce the reflection noise outdoors cannot be know only by the distribution f or each wavelength of the solar irradiance in the earth atmospheric environment of FIG. 3. Therefore, the inspection through various experiments is required.

Theoretically, it may estimated that it will be possible to acquire all iris images outdoors in the infrared wavelength band of 920 nm or more through a distribution diagram for each wavelength of the solar irradiance in the earth atmospheric environment of FIG. 3, but actually, research data of safety for the eye of a person to be photographed of mid-infrared and far-infrared lightings does not also exist, and as a result, the experiment is performed by considering the acceptable wavelength band area range of the IR band-pass filter based on the range (700 to 1400 nm) of the near-infrared area which is a range of a lighting used in the existing iris recognition.

In the present invention, the experiment is repeatedly performed by distinguishing a wavelength band (hereinafter, referred to as a 'low solar irradiance wavelength band') corresponding to 920 to 1500 nm including a partial wavelength band (920 to 1400 nm) and a partial wavelength band (1400 to 1500 nm of the mid-infrared ray (1400 to 3000 nm) from the wavelength band of 700 to 900 nm which is the existing wavelength band recommended by the ISO in the near-infrared wavelength bands corresponding to 700 to 1400 nm which may be actually technically inspected and available.

FIG. 4 illustrates an iris image acquired by photographing the same iris at a left side of respective different persons in the existing 700 to 900 nm wavelength band and low solar irradiance wavelength band (920 nm to −1500 nm) according to an embodiment of the present invention.

As illustrated in FIG. 4, referring to a photo acquired by photographing left irises of two respective other persons D and E in the existing 700 to 900 nm wavelength band outdoors, it can be seen that the surrounding environment is reflected and shown around the eye. On the contrary, referring to the photo acquired by photographing the iris image in the low solar irradiance wavelength band, it can be seen that the reflection image is completely removed around the eye. Accordingly, it can be seen that the iris recognition is actually possible with the iris image photographed in an outdoor photographing wavelength band.

FIG. 5 illustrates a graph for describing dissimilarity according to an embodiment of the present invention.

Dissimilarity is measured in order to evaluate whether the iris recognition is actually possible with the iris images acquired through the repeated experiment (like the iris image illustrated in FIG. 4).

FIG. 5 illustrates a graph for describing dissimilarity according to an embodiment of the present invention.

In general, in an iris recognition method, dissimilarity measurement or recognition rate are used. First, when the recognition rate is described, an error occurs when even though the iris of a person different from the iris of a registered user is input, the iris of the different person is falsely determined as the iris of the same user (false acceptance rate (FAR), hereinafter, referred to as 'FAR') and when even though the iris of the same user as the iris of the registered user is input, the iris of the same user is falsely determined as the iris of another person (false rejection rate (FRR), hereinafter, referred to as 'FRR'). In the iris recognition, it is determined that the recognition rate is higher as two index values of the FAR and the FRR are smaller.

In the case of measurement of the dissimilarity which is one of other indexes, a distribution when a similarity between two iris data of the same person is compared and a distribution when the iris data of the registered person and the iris data of another person are compared are compared to measure a degree in which two distributions are separated from each other and it is determined that the iris recognition is possible as two distributions are better separated from each other.

When the graph of FIG. 5 is described, a left distribution is a distribution (genuine distribution) (hereinafter, a function expressing this distribution is referred to as F(x)) when the similarity between two iris data of the same person which is registered and a right distribution is a distribution (imposter distribution) (hereinafter, a function expressing the distribution is referred to as G(x)) when the iris data of the registered person and the iris data of another person are compared with each other, and an arbitrary value is determined on an x axis and is referred to as a threshold value (the threshold value may be arbitrarily defined). Further, when the dissimilarity (x-axis value) decreases (closer to an origin point), the corresponding person is the same person as the registered person, while when the dissimilarity increases (further from the origin point), the corresponding persons is another person.

In the case of the left distribution of measuring the dissimilarity of FIG. 5, F(x) and G(x) overlap with each other and F(x) and G(x) are not completely separated from each other but in the case of the right distribution, G(x) moves in a direction (a direction to be further from the origin point) in which the value on the x axis increases and F(x) and G(x) do not overlap with each other. Accordingly, in the right distribution, the iris recognition rate is the higher.

FIG. 6 illustrates a distribution acquired by photographing the iris image in the existing 700 to 900 nm wavelength band and low solar irradiance wavelength band (920 nm to 1500 nm) outdoors according to an embodiment of the present invention.

As described in FIG. 5 as above, referring to a result in FIG. 6, the iris image is photographed in the same outdoor environment, but it can be seen that the iris recognition rate is higher in the distribution in the low solar irradiance wavelength band (920 to 1500 nm) than in the distribution in the existing 700 to 900 nm wavelength band.

In the present invention, the existing problem for the reflection noise which makes the iris recognition be almost impossible outdoors is naturally solved by using the band-pass filter using the entirety or parts of the low solar irradiance wavelength band (920 to 1500 nm) to enable the hand-attachable wearable device to recognize the iris even outdoors.

Next, a principle of variously selecting the low solar radiation irradiance using the band-pass filter in the hand-attachable wearable device will be described.

FIG. 7 illustrates a principle of variously selecting the low solar irradiance wavelength band using a band-pass filter according to an embodiment of the present invention.

As illustrated in FIG. 7, a case of (a) means that a wavelength band having a arbitrary width, which includes wavelength bands included in ranges of c1 and c2 is used in the low solar irradiance wavelength band (920 to 1500 nm). For example, when it is assumed that a value of c1 is 1000 nm and the value of c2 is 1300 nm, a wavelength band of 1000 to 1300 nm may be actually used in the band-pass filter, but when the wavelength band is arbitrarily increased like ±10 nm, ±25 nm, ±50 nm, and the like within a range not to 920 to 1500 nm which is the full wavelength band, wavelength bands (a part expressed by a red color) of 990 to 1310 nm, 975 to 1325 nm, and 950 to 1350 nm may be used.

In this case, the band-pass filter passes only an added wavelength included in a wavelength band range having a arbitrary width through and alleviates other wavelengths.

A case of (b) means that at least one of various wavelength bands which are caused by using the wavelength band having the arbitrary width based on c1 and c2 which are arbitrary wavelength values in the low solar irradiance wavelength band (920 to 1500 nm) is selected and used. For example, when it is assumed that the value of c1 is 1000 nm, the value of c2 is 1300 nm, and the arbitrary width is ±100 nm, one band-pass filter may use at least one (the part expressed by the red color) among the wavelength bands of 950 to 1050 nm, 1050 to 1150 nm, 1150 to 1250 nm, and 1250 to 1350 nm. In this case, at least selectable one of various wavelength bands may be used.

Last, a case of (c) means that only a specific wavelength is selected and used in the low solar irradiance wavelength band (920 to 1500 nm). For example, in the B, 1000 nm (d1) may be selected and used in among wavelengths included in the range of 950 to 1050 nm and wavelengths of 1260 nm (d2) and 1300 nm (d3) may be selected and used among the wavelengths include din the range of 1250 to 1350 nm.

The band-pass filter of the solar irradiance wavelength band 920 to 1500 nm may actually use the entire wavelength band of 920 to 1500 nm, but wavelength bans or arbitrary wavelengths having a arbitrary width, which are included in the solar irradiance wavelength band (920 to 1500 nm) are selected and used by considering economical or technical aspects and the wavelength band and arbitrary wavelengths having the arbitrary width are primarily determined according to a range of a wavelength band in which the strength of the irradiance deteriorates by an arbitrary reference value and an acceptable wavelength range of the band-pass filter.

Next, a configuration of a means (hereinafter, referred to as a 'photographing unit') required for photographing and acquiring the iris image of the user in which the iris recognition is possible in the hand-attachable wearable device will be described in detail.

The hand-attachable wearable device is fundamentally constituted by a lens for receiving the iris image in order to photograph the iris image, an image sensor for sensing the iris image input through the lens, and a memory for storing the sensed iris image.

The lens in the present invention is designed in such a manner that a lens view angle at least sufficiently outputs the entirety of one iris image of the user in the wrist type wearable device and as the image sensor, a CMOS image sensor is primarily used rather than a CCD image sensor.

The photographing unit according to the present invention is not just limited to a camera complete product, but includes a camera lens or a camera module such as a smart device including a smart phone, a tablet, a PDA, a PC, and a notebook in which the iris recognition has been introduced or a research into the introduction has been in active progress in recent years.

In general, the resolution of the image required for the iris recognition follows the regulation of the ISO and the ISO regulation stipulates the resolution of the image as the number of pixels of an iris diameter based on the a VGA resolution image.

According to a standard of the ISO, in general, an image having 200 pixels or more is classified into a high-definition image, an image having 170 pixels is classified into a normal-definition image, and an image having 120 pixels is classified into a low-definition image.

Accordingly, in the present invention, in the hand-attachable wearable device, a photographing unit having a high-definition pixel, which may achieve the convenience of the user while acquiring the iris image is used as possible, but since there is a high possibility that various pixel numbers will be adopted due to the image quality of the iris or characteristics of other additional devices, the photographing unit need not particularly be limited to the high-definition pixel.

In particular, in recent years, a high-definition camera module having a 12 M or 16 M-pixel resolution and a transmission speed of 30 frames per second is used for a digital video device and a smart device to sufficiently acquire the image for the iris recognition.

Further, the photographing unit may be generally constituted by one or two or more multiple photographing units.

As the lens, the image sensor, and the memory used for photographing and acquiring the iris image, any lens or image sensor and memory may be used as long as the lens, the image sensor, and the memory meet the purpose and the gist of the present invention.

Next, a means (hereinafter, referred to as an 'indoor and outdoor-combined photographing unit') configured by a configuration for the hand-attachable wearable device to photograph the iris image of which the reflection noise is reduced outdoors as well as indoors in both the indoor and outdoor environments will be described.

First, a means (hereinafter, referred to as an 'indoor and outdoor-combined filter photographing unit) in which the band-pass filter using the entirety or parts of the low solar irradiance wavelength band (920 to 1500 nm) is additionally configured in the photographing unit in order to photograph the iris image indoors as well as outdoors will be described.

The band-pass filter is required, which selectively passes infrared rays through indoors as well as indoors as described above in order to acquire the iris image.

FIG. 8 illustrates an example for describing a configuration of an indoor and outdoor combined filter photographing unit and a position of the band-pass filter according to an embodiment of the present invention.

As illustrated in FIG. 8, in the present invention, the band-pass filter using the entirety or parts of the low solar irradiance wavelength (920 to 1500 nm) is configured to be installed between lens groups (hereinafter, referred to as a 'front end of the image sensor') when the front end of the image sensor, the front end of the lens, or the lens is constituted by a plurality of groups.

FIG. 9 illustrates that iris images of respective different persons F and G are photographed and acquired by using the indoor and outdoor combined filter photographing unit indoors and outdoors in the low solar irradiance wavelength band (920 nm to 1500 nm) according to an embodiment of the present invention.

As illustrated in FIG. 9, it can be seen that in the case of the iris image photographed outdoors, the reflection noise is reduced, and as a result, the iris recognition is possible as compared with the iris image photographed and acquired indoors in the low solar irradiance wavelength band 920 to 1500 nm.

In particular, in the present invention, at least one of the wavelength bands of 920 to 960 nm, 1110 to 1160 nm, and 1300 to 1500 nm in the low solar irradiance wavelength band (920 to 1500 nm) is primarily used as described above.

Accordingly, the indoor and outdoor-combined filter photographing unit may be constituted by the lens for receiving the iris image, the image sensor for sensing the iris image input through the lens, the memory for storing the sensed iris image, and the band-pass filter using the entirety or parts of the low solar irradiance wavelength band (920 to 1500 nm) installed at the front end of the image sensor in order to acquire the iris image in which the reflection noise caused at the time of photographing the iris image indoors and outdoors is reduced.

Next, an actuator (hereinafter, referred to as a 'photographing actuating unit') controlling a distance between the lens and the eye of the user to photograph the iris image in order to photograph and acquire the iris image indoors as well as outdoors will be described.

When the user photographs the iris image while viewing a display of the hand-attachable wearable device, the eye of the user generally tends to come closer to the hand-attachable wearable device indoors than outdoors. The reason is that since indoor light is darker than outdoor light, the user intuitively moves the hand close to both eyes in order to verify the iris image shown in the display.

Accordingly, the photographing actuating unit is in an environment (hereinafter, referred to as a 'short-distance photographing environment') in which the lens needs to move closer to the eye of the user under an outdoor condition, while the photographing actuating unit is in an environment (hereinafter, referred to as a 'long-distance photographing environment') in which the lens needs to move in an opposite direction to the eye of the user under an indoor condition, in order to maintain an arbitrary distance between the lens and the eye for photographing and acquiring the iris image.

The photographing actuating unit is configured to move the lens according to the short-distance photographing environment and the long-distance photographing environment.

The photographing actuating unit used in the present invention may be constituted by a means (hereinafter, referred to as a 'single coil actuating unit') constituted by one coil, one spring, and one magnet in order to move the lens according to the short-distance photographing environment and the long-distance photographing environment.

FIG. 10 illustrates an example for describing a configuration and an actuation principle of a single coil actuating unit which is one of a photographing actuating unit according to an embodiment of the present invention.

As illustrated in FIG. 10, the single coil actuating unit is maintained while being fixed by the spring without making current on the coil in the long-distance photographing environment and pushes up the lens toward the eye of the user by making arbitrary current on one coil in the short-distance photographing environment.

Another photographing actuating unit (hereinafter, referred to as 'multi coil actuating units') used in the present invention may be constituted by two coils and two magnets in order to move the lens according to the short-distance photographing environment and the long-distance photographing environment.

FIG. 11 illustrates an example for describing configurations and actuation principles of multi coil actuating units which is one of the photographing actuating unit according to an embodiment of the present invention.

As illustrated in FIG. 11, the plurality of coil actuating units allows coil 1 to push the magnet or coil 2 to pull the magnet by making the current flow on coil 1 or coil 2 to move the position of the lens downward in the long-distance photographing environment and in a method contrary thereto, the plurality of coil actuating units allows coil 1 to pull the magnet or coil 2 to push the magnet by making the current flow on coil 1 or coil 2 to push up the lens toward the eye of the user.

Yet another photographing actuating unit (hereinafter, referred to as a 'lens magnet actuating unit') used in the present invention may be constituted by a magnet attached to one coil, one spring, and one lens in order to move the lens according to the short-distance photographing environment and the long-distance photographing environment.

FIG. 12 illustrates an example for describing a configuration and an actuation principle of a lens magnet actuating unit which is one of the photographing actuating unit according to an embodiment of the present invention.

As illustrated in FIG. 12, in the lens magnet actuating unit, the magnet attached to the lens moves by making a magnetic field by making the current flow on the coil, and as a result, the lens moves upwards of the eye of the user only in the short-distance photographing and the lens magnet actuating unit is fixed by the spring to remove current consumption in the long-distance photographing environment.

The indoor and outdoor-combined photographing unit may be configured by independently the indoor and outdoor-combined filter photographing unit or the photographing actuating unit or configured by combining the indoor and outdoor-combined filter photographing unit and the photographing actuating unit.

Next, a means (hereinafter, referred to as an 'indoor and outdoor-separated photographing unit') performing photographing by differentiating the configuration of the photographing unit indoors and the configuration of the photographing unit outdoors so as for the hand-attachable wearable device to photograph the iris image in which the reflection noise is reduced outdoors as well as indoors will be described.

In the indoor and outdoor-separated photographing unit, the band-pass filter using the entirety or parts of the low solar irradiance wavelength band (920 to 1500 nm) outdoors is constituted by a means in which the band-pass filter using the existing 700 to 900 nm wavelength band indoors is additionally configured in the photographing unit in order to photograph the iris image.

Accordingly, the indoor and outdoor-separated filter photographing unit may be constituted by the lens for receiving the iris image, the image sensor for sensing the iris image input through the lens, the memory for storing the sensed iris image, the band-pass filter using the entirety or parts of the low solar irradiance wavelength band (920 to 1500 nm) installed at the front end of the image sensor in order to acquire the iris image in which the reflection noise caused at the time of photographing the iris image outdoors is reduced, and the band-pass filter using the existing 700 to 900 nm wavelength band, which is installed at the front end of the image sensor in order to acquire the iris image in which the reflection noise caused at the time of photographing the iris image indoors is reduced.

The indoor and outdoor-combined photographing unit and the indoor and outdoor-separated photographing unit have an environment selection mode to distinguish and select the indoor and outdoor environments. The environment selection mode may be manually switched according to determination of a photographer or automatically switched by configuring an optical sensor or irradiance measuring equipment that measures the intensity of light.

Since such an environment selection mode configuring method has already been known in the related art, any technique may be used if the technique meets the purpose and the gist of the present invention.

An infrared lighting is fundamentally used, but when the hand-attachable wearable device using not the infrared rays but the visible rays is used, it is preferable that a lighting unit turning on the infrared lighting is additionally configured.

As a method for controlling the light source, first, a method that turns off a visible lighting and turns on the infrared lighting is used when the visible lighting is used and the iris image is photographed or second, a method in which an infrared filter is attached to the visible lighting and only the infrared rays are used as the light source is used when the infrared filter is attached to the visible lighting and only the infrared rays are used as the light source.

Further, as the infrared lighting, the light source of the infrared lighting having one or more wavelengths which pass through the wavelength band of the band-pass filter is installed.

Exceptionally, even though the hand-attachable wearable device is constituted by the band-pass filter using the existing 700 to 900 nm wavelength band, and the photographing actuating unit and the photographing unit, the hand-attachable wearable device may perform outdoor photographing. Since the view angle input into the photographing unit of the hand-attachable wearable device is reduced and the reflection noise is thus reduced in the short-distance photographing environment by using such a configuration, the iris image in which the reflection noise is reduced may be acquired without a filter using the entirety or parts of the low solar irradiance wavelength band. In particular, when the iris image is photographed after leaning against the sun or hiding light with the hand or moving to a shadowy place (after selecting a simple method that controls the amount of light), this case may occur, and as a result, the configuration in which the band-pass filter using the 700 to 900 nm wavelength, and the photographing actuating unit and the photographing unit are combined may also meet the purpose of the present invention.

Next, a configuration of the present invention considering that the display which the user views is relatively smaller among unique characteristics of the hand-attachable wearable device itself will be described in detail.

The existing devices for the iris recognition verifies whether one eye is focused on an appropriate area through a front display screen while the user applies his/her eye to a camera on a front surface of the device and to this end, a means for notifying an eye position of the user to the user is used, which serves to guide the eye position of the user so as to accurately acquire the iris image of the user according to the position of the camera. In particular, the camera lens is positioned above or below a screen on the front surface in order to recognize the iris on a terminal having a large screen, such as the smart phone and when the camera lens is positioned above the front surface, a phenomenon in which an iris area is covered by an eyebrow or eyelid frequently occurs and when the camera lens is positioned below the front surface, there is an effort in which the user needs to raise a terminal a lot.

Further, when a distance from the camera lens to the center of the display screen as the front display screen is very large, the user views a middle part of the display screen and in this case, the user wrongly views the screen, and as a result, the area corresponding to the iris is not well acquired. When the iris image acquired in this case is authenticated, distortion occurs to exert a bad influence on the authentication rate of the iris recognition. Further, the user may be induced close to the camera lens by making a particular area with a GUI, but in this case, only when the user may not use inconveniently or intuitively the smart phone and needs to acquire the image in an inconvenient form to increase the recognition rate and it is predicted that such inconvenience will be heightened with a recent tendency in which the screen of the smart phone is enlarged.

FIG. 13 illustrates an example for describing a disadvantage which occurs when photographing an iris image while viewing a display screen of a smart phone according to an embodiment of the present invention.

As illustrated in FIG. 13, when the user views the front surface of the smart phone, the camera that photographs the iris is positioned above the display (LCD), and as a result, an upper eyebrow and an upper eyelid cover an upper portion of the iris. Further, in order to avoid the problem, when the display (LCD) of the smart phone is raised up to be adjusted to the eye position, the user naturally covers the upper portion of the iris while raising his/her eyes. On the contrary, in general, when the user adjusts the display (LCD) of the smart phone downward to be adjusted to the eye position as an attitude in which the user uses the smart phone, a phenomenon in which the iris is covered by the eyebrow may be reduced, but a lower portion of the iris in a lower part covers a significant part.

However, in the hand-attachable wearable device, the display screen is relatively smaller and the distance between the center of the display screen which the users views at the time of acquiring the iris image and the photograph unit is within 2 to 3 cm and further, the user intuitively performs photographing so that the eye of the user is wholly positioned in the display screen.

FIG. 14 illustrates an example for assisting appreciation of a process of picking the iris image while a user views the display screen in a hand-attachable wearable device according to an embodiment of the present invention.

As illustrated in FIG. 14, the user acquires the iris image in which the iris recognition is possible by intuitively moving the hand-attachable wearable device. In particular, the indoor and outdoor-combined photographing unit or the indoor-outdoor-separated photographing unit is installed so that the user is positioned at an angle set so as to easily photograph an eye portion area while naturally viewing the display screen to easily photograph the entirety of the eye portion area required for the iris recognition.

Next, the display in the hand-attachable wearable device will be described in detail.

As the display, As the display, a cold mirror (a visible-ray reflection filter) or displays including the LCD, an LED, an OLED, and the like may be installed so as to move a back-hand or wrist type wearable device to a position where the user may rapidly acquire an excellent image so as to allow the iris image to be viewed when the eye is picked by the photographing unit. In this case, as illustrated in FIG. 14, a virtual guide line or arbitrary figures including a square, a circle, an oval, and the like are made in the cold mirror (a visible-ray reflection filter) or the displays including the LCD, the LED, the OLED, and the like to allow the user to rapidly acquire the excellent image, thereby preventing the iris image from being distorted or the iris image from being blurredly photographed.

In the present invention, in particular, the indoor and outdoor-combined photographing unit or the indoor and outdoor-separated photographing unit is installed on the bottom or at a left side or a right side of the display screen positioned at the angle set so as for the user to easily photograph the iris image (may include the entirety of the eye portion area) the iris image required for the iris recognition while naturally viewing the display screen, and as a result, since the indoor and outdoor-combined photographing unit or the indoor and outdoor-separated photographing unit is sufficiently installed in terms of cost or in terms of a spatial limit due to a physical size, there is no difficulty to apply the present description.

Next, a configuration of the present invention considering that a wearing position of the user is frequently changed among the unique characteristics of only the hand attached-type wearable device itself will be described in detail.

There is a high possibility that the user will not use the wearable device without distinguishing a position to be worn, but will alternately use both hands or an arbitrary finger with respect to both the wrist type and the ring type in the case of the hand-attachable wearable device unlike other devices and in addition, there is a very high possibility that the user will wear the wearable device without distinguishing upper and lower positions.

FIG. 15 illustrates an example for appreciating that a position is not easily distinguished when upper and lower directions of a wrist type wearable device and a ring type wearable device are changed according to an embodiment of the present invention.

As illustrated in FIG. 15, the user may use the hand-attachable wearable device without distinguishing that the upper and lower-direction positions are changed and feeling separate resistance even when wearing the hand-attachable wearing device by changing the upper and lower directions.

There are a lot of cases in which the position of the wrist type wearable device to be worn is primarily determined by a personal habit (a right-handed person or a left-handed person). Further, there is a high possibility that the user will not use the wearable device without distinguishing the position to be worn, but will alternately use both hands and in addition, there is a very high possibility that the user will wear the wearable device without distinguishing upper and lower positions.

In particular, there is very high possibility that the user will wear the ring type wearable device without distinguishing the upper and lower directions and the finger.

Accordingly, when both the position of the display and the position of the photographing unit are configured according to a hand in a specific direction, there is a very high possibility that the upper image will be picked while the upper and lower parts overturn.

Next, a means (hereinafter, referred to as a 'wearing position verifying unit') for preventing the iris image from being changed by recognizing that the wearing position of the hand-attachable wearable device is changed will be described.

The wearing position verifying unit may be configured to notify, in order to prevent the error from occurring during the iris recognition as the photographed iris image is also changed by 180° when the upper and lower parts of the hand-attachable wearable device overturn, the problem in advance to allow the user to manually change the upper and lower parts or rotate the photographed iris image by 180° by using the sensor that senses that the upper and lower parts overturn and store the corresponding iris image in the memory.

(T1) Means for User to Manually Change Upper and Lower Parts by Recognizing Overturn of Upper and Lower Parts by Means of Indicator The state in which the upper and lower parts of the hand-attachable wearable device are changed is notified to the user by forming a configuration in which at least one of a color, a character, a symbol, and a mark which are indicators to identify the upper and lower is selected and displayed is formed at one side of an exterior of the hand-attachable wearable device to allow the user to autonomously change the position of the hand-attachable wearable device or to rotate the photographed iris image by 180° and store the rotated iris image by mounting a simple key or an application program on the memory and manually changing the changed mark through operating the key or application program.

(T2) Means Using Sensor that Senses that Upper and Lower Parts are Changed

One of a gravity sensor, a gyro sensor, and a pressure sensor is selected and installed inside or outside the hand-attachable wearable device and a means is configured, which changes the direction in advance or rotates the photographed iris image by 180° and stores the rotated iris image by selecting and configuring at least one of a configuration that notifies that the upper and lower positions are changed by the voice through a speaker before photographing the iris image by means of the hand-attachable wearable device by a signal generated from the installed sensor and a configuration that displays a message in a display unit installed at one side of the exterior of the hand-attachable wearable device and notifying the configuration to the user to change the upper and lower directions.

Further, the photographed iris image is automatically rotated by 180° and stored based on the signal generated from the sensor.

The gravity sensor as a sensor that senses a direction in which gravity moves to generate the signal is configured to generate the signal when a phenomenon in which the upper and lower positions are changed occurs and the gyro sensor as a sensor that may sense a slope may be configured to generate the signal by sensing a change in slope. Further, as the pressure sensor, a pressure sensor having a small volume, which may sense minute pressure may be fixed and installed in a small rectangular parallelepiped or cylindrical lower or upper part and the pressure may be configured to operate when a ball or bearing having an arbitrary weight is positioned in the upper part of the pressure sensor.

Next, a configuration of the present invention considering that the user does not take off the hand-attachable wearable device once the user wears the hand attached-type device among the unique characteristics of only the hand attached-type wearable device itself will be described in detail.

The hand-attachable wearable device has a characteristic in that the user does not take off the hand-attachable wearable device once the user wears the hand-attachable wearable device unlike other devices. Accordingly, since the user does not generally take off the wearable device once the user wears the wearable device, it may be very inconvenient for the user to continuously take an authentication like a cellular phone whenever using the wearable device. On the contrary, since a risk of loss and robbery is small due to such a characteristic, the hand-attachable wearable device may be safely used without additional personal authentication as long as taking off the hand-attachable wearable device once the authentication is performed when first wearing the hand-attachable wearing device unlike other security devices.

When a session is maintained by single sign-on (integrated authentication) that enables resources on various computers to be used through one authentication process in the terminal such as the smart phone, if a method that does not require additional authentication is used, critical accidents associated with financial settlement and identification may be caused when the terminal is lost or robbed. On the contrary, since the user does not easily take off the hand-attachable wearable device, the risk of the loss and robbery is small and when the user intentionally takes off the hand-attachable wearable device or the hand-attachable wearable device is unintentionally released, whether the user intentionally takes off the hand-attachable wearable device or the hand-attachable wearable device is unintentionally released may be sensed by using a means (hereinafter, referred to as a 'wearing sensing verifying unit') for determining whether to wear the hand-attachable wearable device, and as a result, the hand-attachable may be very conveniently used while maintaining advance security.

In more detail, it may be verified whether the user wears the hand-attachable wearing device or whether the wearing is released through the wearing sensing verifying unit. If the user does not release wearing after first user authentication through the iris recognition, the user authentication is additionally required during the wearing and a transmission/reception process with an IoT device is continuously maintained (the session is maintained) and when the user releases the wearing, the transmission/reception process with the IoT device is released (the session is disconnected) and the user authentication may be configured to be performed again.

Next, the wearing sensing verifying unit that recognizes wearing of the hand-attachable wearable device will be described.

Connection lines to sense that a magnetic sensor, a capacitive touch sensor, a temperature sensor, and a proximity sensor are cut from a band is installed at one side of (inside or outside) the band of the hand-attachable wearing device in addition to mechanical devices including a spring, a hinge, and the like to sense the wearing of the wrist type wearable device and the sensor that senses the wearing is mounted on a case of the wrist type wearable device or mounted on the band.

FIG. 16 illustrates an example of a wearing sensing verifying unit configured by a magnetic sensor of the hand-attachable wearable device through a picture according to an embodiment of the present invention.

As illustrated in FIG. 16, when the user wears the hand-attachable wearable device, the signal is generated while magnetic sensors 1601 and 1606 are coupled with magnets 1602 and 1607 (as a distance between the magnetic sensor and the magnet decreases) (ON), while when the user takes off the hand-attachable wearable device (the distance between the magnetic sensor and the magnet increases), the signal disappears (OFF).

FIG. 17 illustrates an example of a wearing sensing verifying unit configured by a static electricity sensor of the hand-attachable wearable device through the picture according to an embodiment of the present invention.

As illustrated in FIG. 17, when the user wears the hand-attachable wearable device, the signal is generated as static electricity is generated while static electricity sensors 1701, 1705, and 710 are coupled with sensing magnets 1702, 1706, and 1711 (ON), while when the user takes off the hand-attachable wearable device, the signal disappears while the static electricity disappears (OFF).

FIG. 18 illustrates an example of a wearing sensing verifying unit configured by a temperature sensor of the hand-attachable wearable device through the picture according to an embodiment of the present invention.

As illustrated in FIG. 18, when the user wears the hand-attachable wearable device, if the temperature of the band increases by the temperature of the wrist or the finger and the temperature of the temperature of the band is higher than a temperature of an arbitrary reference value, temperature sensors 1801, 1804, and 1808 sense the corresponding temperature to generate the signal (ON), while when the user takes off the hand-attachable wearable device, the signal disappears while the temperature of the band is lower than the temperature of the arbitrary reference value (OFF).

FIG. 19 illustrates an example of a wearing sensing verifying unit configured by a proximity sensor of the hand-attachable wearable device through the picture according to an embodiment of the present invention.

As illustrated in FIG. 19, when the user wears the hand-attachable wearable device, proximity sensors 1901, 1904, and 1908 senses wearing of the hand-attachable wearable device to generate the signal (ON), while when the user takes off the hand-attachable wearable device, the signal disappears (OFF).

In this case, when all of the connection lines of the respective sensors are configured in one band, since it may be sensed that the user wears the hand-attachable wearable device similarly even though the other band is cut or the user wears the hand-attachable wearable device, it may be accurately determined whether the user wears the hand-attachable wearable device even when one band is cut or the user does not wear the hand-attachable wearable device by particularly connecting lines included in both bands.

Next, a configuration of the present invention considering that a possibility that the user will operate the hand-attachable wearing device by a connected device among the unique characteristics of only the hand attached-type wearable device itself will be described in detail.

Since there is a very high possibility that the hand-attachable wearable device will be operated as the connected device to be used to interlock with each other by real time mutual transmission and exchange through various Internet of things (IoT) devices such as the smart phone, the hand-attachable wearable device is sensitive to a security problem.

For example, due to a structure of the terminal concentrated with an RGB camera, buttons, an audio receiver, an illuminance sensor, and the like, a dedicated camera module capable of the iris recognition is not easily mounted on the existing smart phone. Accordingly, the personal authentication is performed by the iris recognition through the hand-attachable wearable device without performing the iris recognition through the smart phone and the authentication is notified through the smart phone to permit the smart phone to be used.

Next, a means (hereinafter, referred to as an 'iris recognizing unit') for the iris recognition of the hand-attachable wearing device will be described.

The iris recognizing unit is constituted by a means for measuring whether the photographed iris image has a quality suitable for the iris recognition, a preprocessing means for extracting only the iris from the photographed iris image so as to an iris template, and a means for generating the iris template from the iris image.

In the present invention, the iris template as an iris image format stored in the memory to be used when determining the similarity of the iris image in order to determine whether the iris images are the same as each other means an iris image format which has a personal unique bio characteristic, but has the size of the memory for memorizing the personal unique bio characteristic, which is relatively smaller than an original iris image measured by the camera and the iris template processes the iris image through Fourier transform or wavelet transform in order to increase a processing speed during the authentication and decrease a memory capacity during the storing.

When the process of the iris recognition is described in detail, a process that evaluates whether the photographed iris image has a quality criterion suitable for the iris recognition (the means for measuring whether the iris image has the quality suitable for the iris recognition), extracts only the iris so as to create the iris template from the evaluated iris image (the preprocessing means, the preprocessing means may be omitted), and creates the iris template from the extracted iris (the means for creating the iris template) is performed. In this case, the quality criterion of the iris image may include autonomous quality evaluation criterion information including clearness, occlusion, and the like of the iris image.

Since a technical configuration that measures the quality of the iris image according to the present invention is disclosed in detail in Patent Registration No. 10-1030652 registered through patent application by the present invention applicant, the technical configuration is not disclosed in the present specification.

As described above, since prior art for the iris recognition is art which has already been known, more detailed description will be omitted.

Accordingly, any iris recognition technique may be used if the iris recognition technique meets the purpose and the gist of the present invention which photographs the iris image, creates the iris template from the photographed iris image, and performs the iris recognition by using the created iris template and for easy description, the iris image or iris template is defined as 'iris image information' in the present invention.

Next, a means (hereinafter, referred to as a 'security strengthening unit') for the security required for the hand-attachable wearable device to communicate with other devices will be described.

FIG. 20 illustrates an example for assisting appreciation of a process of communication between the hand-attachable wearable device and an IoT device according to an embodiment of the present invention.

As illustrated in FIG. 20, the hand-attachable wearing device photographs the iris image of the user, receives the authentication as the photographed iris image is created as the iris image information through the iris recognizing unit, and thereafter, perform communication with the IoT device. In this case, the IoT device corresponds to all devices in which the Internet of things is possible, which include a mobile device such as the smart phone or the tablet, a security device such as a door lock, a transport device such as a vehicle, various medical devices used in a hospital, and the like in addition to a computer such as a PC in the related art. In this case, as communication, wireless communication to be described below is primarily used.

FIG. 21 illustrates an example for describing a configuration of a security strengthening unit of the hand-attachable wearable device according to an embodiment of the present invention.

As illustrated in FIG. 21, the security strengthening unit is constituted by a means (hereinafter, referred to as an 'iris encrypting module') for encrypting the iris image information used when the hand-attachable wearing device and the IoT device transmit and receive information to and from each other, a means (hereinafter, referred to as a 'device encrypting module') for encrypting identifiable information of the hand-attachable wearing device or encrypting information for determining a use time and a position of the hand-attachable wearing device, and a means (hereinafter, referred to as a 'communication module') for communicating with the IoT device.

The iris encrypting module 2101 inserts a token or a key created and transferred from the IoT device into the iris image information to encrypt the iris image information. In particular, a digital watermark is particularly inserted into the iris image information against a case that the iris image information is attempted to be fabricated during mutual transmission/reception. In this case, it is preferable that the process of inserting the digital watermark is protected from external intrusion in terms of hardware so as to prevent the insertion process from being leaked.

The device encrypting module 2102 selects and encrypts at least one of a unique number, a personal identification number, and an one time password (OTP) of the terminal in order to verify whether the hand-attachable wearing device is a proper device that directly transmits the information during the mutual transmission/reception. In this case, when the iris encrypting module encrypts the iris image information, the iris encrypting module may add and encrypt at least one of the unique number, the personal identification number, and the OTP of the terminal.

Further, the iris encrypting module may encrypt both a time when the hand-attachable wearing device photographs or creates the iris image information or positional information on a place where the photographing and the creation are performed.

When the token or key created and transferred from the IoT device is transmitted, the time is compared and when it is determined that the time is longer than an arbitrary time, the transmission/reception process may stop (the session may stop). Further, by using absolute positional information using GPS information or relative positional information using a base station or a wireless AP connected with the terminal, when it is determined that the hand-attachable wearing device deviates from an arbitrary position, the transmission/reception process may stop (the session may stop).

The communication module 2103 communicates with the IoT device and in particular, wireless communication is primarily used due to a characteristic of the hand-attachable wearing device.

Further, it may be verified whether the user wears the hand-attachable wearing device or whether the wearing is released through the wearing sensing verifying unit. If the user does not release wearing after first user authentication through the iris recognition, the user authentication is additionally required during the wearing and a transmission/reception process with an IoT device is continuously maintained (the session is maintained) and when the user releases the wearing, the transmission/reception process with the IoT device is released (the session is disconnected) and the user authentication may be configured to be performed again.

The wireless communication in the present invention includes both communication in which data may be transmitted/received through an Internet protocol by using various wireless communication technologies including an Internet network, an intranet network, a mobile communication network, a satellite communication network, and the like which are generally used and short-range wireless communication.

In particular, the short-range wireless communication means communication means including LF communication primarily used at the time of opening of a vehicle or start the vehicle, Bluetooth, nearfield communication (NFC), Wi-Fi, Wi-Fi direct, and the like.

The IoT device may include a short-range wireless communication chip for the short-range wireless communication. Further, the IoT device needs to fundamentally include a communication means which may transmit/receive encrypted information, a decryption means which may decipher a code, and a means for verifying whether the transmitted and received information is accurate information. In most IoT devices, the means has already been configured or may be configured by software.

The IoT device corresponds to all devices in which the Internet of things is possible, which include a mobile device such as the smart phone or the tablet, a security device such as a door lock, a transport device such as a vehicle, various medical devices used in a hospital, and the like in addition to a computer such as a PC in the related art.

INDUSTRIAL APPLICABILITY

The present invention relates to a hand-attachable wearing device capable of iris recognition indoors and outdoors, particularly, to a hand-attachable wearable device capable of iris identification outdoors and/or indoors, which includes an electronic component case and a band covering a wrist or a finger, and particularly, to a hand-attachable wearable device capable of iris identification outdoors and/or indoors, which includes an indoor and outdoor-combined photographing unit or an indoor and outdoor-separated photographing unit installed at one side of the case, which is used for photographing an iris image in which reflection noise is reduced indoors and outdoors, an infrared lighting installed at one side of the case and required for definitely photographing the iris image, and an iris recognition unit performing the iris recognition by comparing registered and registered iris image information and photographed iris image information.

What is claimed is:

1. A hand-attachable wearing device capable of iris recognition indoors and outdoors, which includes an electronic component case and a band covering a wrist or a finger, comprising:
   an indoor and outdoor-combined photographing unit installed at one side of the case and photographing an iris image in which reflection noise is reduced indoors and outdoors;
   an infrared lighting installed at one side of the case and clearly photographing the iris image; and
   an iris recognizing unit performing the iris recognition by comparing registered and stored iris image information and photographed iris image information;
   wherein the indoor and outdoor-combined photographing unit is configured by an indoor and outdoor-combined filter photographing unit or a composition in which a photographing actuating unit is combined with an indoor and outdoor-combined filter photographing unit; and
   wherein the indoor and outdoor-combined filter photographing unit includes:
      a lens installed at a front end of the image sensor and configured so that a view angle covers photographing an entire eye area of a user,
      an image sensor installed at a rear end and sensing an iris image input through the lens,
      a memory storing the photographed iris image, and
      a band-pass filter installed at the front end of the image sensor and using the entirety or parts of a solar irradiance wavelength band (920 to 1500 nm).

2. A hand-attachable wearing device capable of iris recognition indoors and outdoors, which includes an electronic component case and a band covering a wrist or a finger, comprising:
   an indoor and outdoor-separated photographing unit installed at one side of the case and photographing an iris image in which reflection noise is reduced indoors and outdoors;
   an infrared lighting installed at one side of the case and clearly photographing the iris image; and
   an iris recognizing unit performing the iris recognition by comparing registered and stored iris image information and photographed iris image information;
   wherein the indoor and outdoor-separated photographing unit is configured by an indoor and outdoor-separated filter photographing unit or a composition in which the photographing actuating unit is combined with the indoor and outdoor-separated filter photographing unit;

wherein the indoor and outdoor-separated filter photographing unit includes:
- a lens receiving the iris image,
- an image sensor sensing the iris image input through the lens,
- a memory storing the sensed iris image, and
- respective different band-pass filters which are configured to be separately used at a front end of the image sensor at the time of photographing the iris image indoors and photographing the iris image outdoors; and wherein as a band-pass filter used at the time of photographing the outdoor iris image, a band-pass filter passing the entirety or parts of a low solar irradiance wavelength of 920 to 1500 nm through is installed at the front end of the image sensor.

3. A hand-attachable wearing device capable of iris recognition indoors and outdoors, which includes an electronic component case and a band covering a wrist or a finger, comprising:
- a lens receiving an iris image in which reflection noise is reduced by adjusting the amount of light indoors and outdoors;
- an image sensor sensing the iris image input through the lens;
- a memory storing the iris image sensed by the image sensor;
- a band-pass filter installed at a front end of the image sensor and passing a wavelength band of 700 to 900 nm;
- a photographing actuating unit installed on the lens;
- an infrared lighting installed at one side of the case and clearly photographing the iris image; and
- an iris recognizing unit performing the iris recognition by comparing registered and stored iris image information and photographed iris image information;
- wherein the photographing actuating unit is configured by selecting one of a single coil actuating unit, multi coil actuating units, and a lens magnet actuating unit.

4. The hand-attachable wearing device capable of iris recognition indoors and outdoors of claim 1, wherein a display capable of verifying the photographed iris image is added.

5. The hand-attachable wearing device capable of iris recognition indoors and outdoors of claim 1, wherein a wearing position verifying unit is added, which prevents the photographed image from being changed by recognizing that a wearing position of the hand-attachable wearable device is changed.

6. The hand-attachable wearing device capable of iris recognition indoors and outdoors of claim 1, wherein a wearing sensing verifying unit for sensing whether the hand-attachable wearing device is worn is added.

7. The hand-attachable wearing device capable of iris recognition indoors and outdoors of claim 1, wherein a security strengthening unit for maintaining security when the hand-attachable wearing device communicates with other device is added.

8. The hand-attachable wearing device capable of iris recognition indoors and outdoors of claim 1, wherein parts of the low solar irradiance wavelength of 920 to 1500 nm is configured by a wavelength having a arbitrary width or arbitrary wavelengths included in a range of the low solar irradiance wavelength of 920 to 1500 nm.

9. The hand-attachable wearing device capable of iris recognition indoors and outdoors of claim 8, wherein the wavelength band having the arbitrary width and the arbitrary wavelengths are determined by a range of a wavelength band in which the strength of irradiance decreases by an arbitrary reference value or more and acceptable wavelength range of the band-pass filter.

10. The hand-attachable wearing device capable of iris recognition indoors and outdoors of claim 8, wherein the wavelength band having the arbitrary width, which is included in the low solar irradiance wavelength of 920 to 1500 nm includes at least one wavelength band of a wavelength band of 920 to 960 nm, a wavelength band of 1110 to 1160 nm, and a wavelength band of 1300 to 1500 nm.

11. The hand-attachable wearing device capable of iris recognition indoors and outdoors of claim 8, wherein the arbitrary wavelengths included in the low solar irradiance wavelength of 920 to 1500 nm include at least one wavelength band of the wavelength band of 920 to 960 nm, the wavelength band of 1110 to 1160 nm, and the wavelength band of 1300 to 1500 nm.

12. The hand-attachable wearing device capable of iris recognition indoors and outdoors of claim 1, wherein the single coil actuating unit is maintained while being fixed by the spring without making current on the coil in the long-distance photographing environment and pushes up the lens toward the eye of the user by making arbitrary current on one coil in the short-distance photographing environment.

13. The hand-attachable wearing device capable of iris recognition indoors and outdoors of claim 1, wherein the multi coil actuating units is configured in such a manner that one coil (coil 1) pushes a magnet or the other coil (coil 2) pulls the magnet by making current flow on one coil (coil 1) or the other coil (coil 2) to make the lens go downward in the long-distance photographing environment and one coil (coil 1) pulls the magnet or the other coil (coil 2) pushes the magnet by making the current flow on one coil (coil 1) or the other coil (coil 2) to push the lens upward toward an eye of a user in a contrary method in the short-distance photographing environment.

14. The hand-attachable wearing device capable of iris recognition indoors and outdoors of claim 1, wherein the lens magnet actuating unit is configured to fix the lens by the spring in the long-distance photographing environment and move the lens upward toward the eye of the user as the magnet attached to the lens moves by forming a magnetic field through making the current flow on the coil in the short-distance photographing environment.

15. The hand-attachable wearing device capable of iris recognition indoors and outdoors of claim 1, wherein the lens magnet actuating unit removes current consumption by fixing the lens by the spring to minimize the current consumption in a stand-by state in the long-distance photographing environment.

16. The hand-attachable wearing device capable of iris recognition indoors and outdoors of claim 3, wherein the indoor and outdoor-combined photographing unit or the indoor and outdoor-separated photographing unit has an environment selection mode to distinguish and select the indoor and outdoor environments.

17. The hand-attachable wearing device capable of iris recognition indoors and outdoors of claim 16, wherein the environment selection mode is manually switched according to determination of the user or automatically switched by configuring an optical sensor or irradiance measuring equipment that measures the intensity of light.

18. The hand-attachable wearing device capable of iris recognition indoors and outdoors of claim 4, wherein the display selects and uses one of a virtual guide line, a square, a circle, and an oval, and preventing the iris image from being distorted or the iris image from being blurredly photographing.

19. The hand-attachable wearing device capable of iris recognition indoors and outdoors of claim 4, wherein the indoor and outdoor-combined photographing unit or the indoor and outdoor-separated photographing unit is installed on the bottom or at a left side or a right side of the display screen by configuring as arbitrary angle to set users to easily pick up the iris image.

20. The hand-attachable wearing device capable of iris recognition indoors and outdoors of claim 5, wherein the wearing position verifying unit is configured by the indicator that helps users change a wearing position manually by recognizing it, or is configured by a sensor that senses upper and lower parts are changed.

21. The hand-attachable wearing device capable of iris recognition indoors and outdoors of claim 20, wherein the method of manual changing is configured by an indicator capable of identifying the upper and lower parts is formed at one side of an exterior of the hand-attachable wearable device to help the user to change the wearing position.

22. The hand-attachable wearing device capable of iris recognition indoors and outdoors of claim 21, wherein in the cases, the user personally changes the position of the hand-attachable wearable device or mounts a simple key or application program in the memory to manually change the operations thereof.

23. The hand-attachable wearing device capable of iris recognition indoors and outdoors of claim 21, wherein the indicator is configured by selecting and displaying at least one of a color, a character, a symbol, and a mark.

24. The hand-attachable wearing device capable of iris recognition indoors and outdoors of claim 20, wherein the means using the sensor that senses the upper and lower parts are changed notifies that the upper and lower positions are changed before photographing the iris image by a voice through a speaker or by displaying a message in a display unit installed at one side of the exterior of the hand-attachable wearable device by a signal generated from the sensor.

25. The hand-attachable wearing device capable of iris recognition indoors and outdoors of claim 24, wherein as the sensor, one of a gravity sensor, a gyro sensor, and a pressure sensor is selected and installed.

26. The hand-attachable wearing device capable of iris recognition indoors and outdoors of claim 6, wherein the wearing sensing verifying unit is configured by sensing the wearing status by mounting the sensor on a case or band of the hand-attachable wearing device.

27. The hand-attachable wearing device capable of iris recognition indoors and outdoors of claim 6, wherein the wearing sensing verifying unit is configured to maintain a current user authentication state without requiring an additional user authentication while the user wears the hand-attachable wearable device after the user authentication (iris recognition), and to perform a user authentication again when a user cancels wearing the hand-attachable wearable device.

28. The hand-attachable wearing device capable of iris recognition indoors and outdoors of claim 26, wherein the sensor sensing the wearing is constituted by at least one of a spring, a hinge, a magnetic sensor, a capacitive touch sensor, a temperature sensor, and a proximity sensor.

29. The hand-attachable wearing device capable of iris recognition indoors and outdoors of claim 7, wherein the security strengthening unit comprises:
   an iris encrypting module encrypting iris image information used during communication (transmission/reception) of information between the hand-attachable wearable device and an IoT device, and
   a communication module communicating with the IoT device.

30. The hand-attachable wearing device capable of iris recognition indoors and outdoors of claim 7, wherein the security strengthening unit additionally includes a device encrypting module that encrypts at least one of information to identify the hand-attachable wearable device and information to determine a use time and a position of the hand-attachable wearable device.

31. The hand-attachable wearing device capable of iris recognition indoors and outdoors of claim 29, wherein the iris encrypting module inserts a token or a key created and transferred from the IoT device into the iris image information to encrypt the iris image information.

32. The hand-attachable wearing device capable of iris recognition indoors and outdoors of claim 29, wherein the iris encrypting module encrypts the iris image information by using a digital watermark in order to strengthen security of the iris image information.

33. The hand-attachable wearing device capable of iris recognition indoors and outdoors of claim 30, wherein the information to identify the hand-attachable wearable device is configured by selecting at least one of a unique number of the device, a personal identification number, and an one time password (OTP).

34. The hand-attachable wearing device capable of iris recognition indoors and outdoors of claim 30, wherein the information to determine the use time of the hand-attachable wearable device is information on an elapsed time by comparing the time when the token or key created and transferred from the IoT device is transmitted.

35. The hand-attachable wearing device capable of iris recognition indoors and outdoors of claim 30, wherein the information to determine the position of the hand-attachable wearing device is relative positional information using a unique number of a base station or a wireless AP connected with a terminal or absolute positional information using GPS information.

36. The hand-attachable wearing device capable of iris recognition indoors and outdoors of claim 30, wherein the device encrypting module adds at least one of the unique number of the hand-attachable wearable device, the personal identification number, the one time password (OTP), and time information when the iris information is photographed or created and positional information on a place where the iris image information is photographed or created to the encrypted iris image information and encrypts the added information.

37. The hand-attachable wearing device capable of iris recognition indoors and outdoors of claim 1, wherein the hand-attachable wearing device is a wearable device worn on a wrist or a wearable device worn on a finger.

* * * * *